May 29, 1951 C. J. KING 2,555,041
AUTOMATIC SAFETY DEVICE FOR MINE CAGES
Filed April 24, 1947 3 Sheets-Sheet 1

Inventor
CLIFFORD J. KING
by
W. Junius Haskett
Attorney

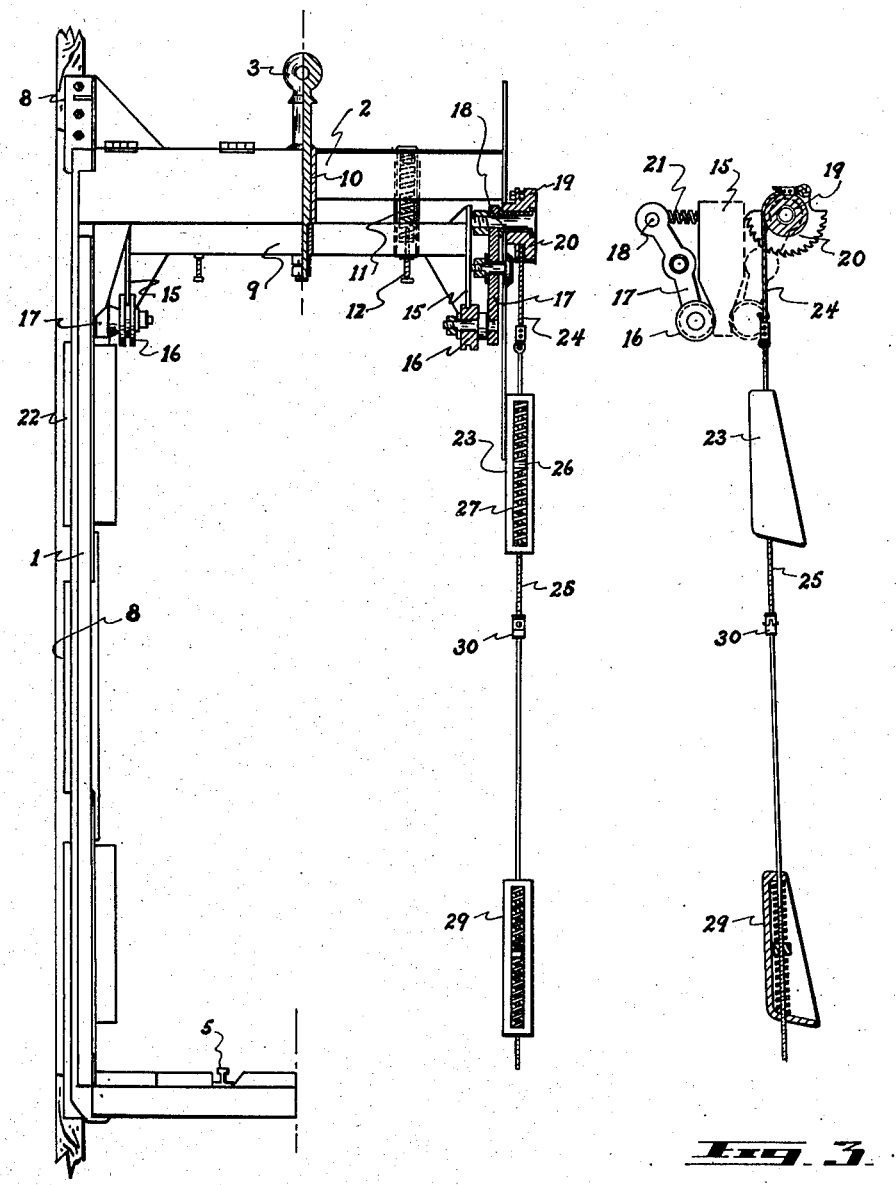

Inventor
CLIFFORD J. KING

Patented May 29, 1951

2,555,041

UNITED STATES PATENT OFFICE 2,555,041

AUTOMATIC SAFETY DEVICE FOR MINE CAGES

Clifford John King, Malartic, Quebec, Canada

Application April 24, 1947, Serial No. 743,683

19 Claims. (Cl. 187—88)

1

The present invention relates to improvements in an automatic safety device for a mine cage and appertains particularly to a braking system for man cages, skips and combinations in vertical or inclined shafts.

The principal object of the invention is to provide a reliable and efficient means of holding or decelerating and arresting a mine cage or the like when hoisting mechanism fails for any reason as when the cable breaks.

A further object of the invention is to provide a mine cage safety device with greatly increased braking surfaces that wedge tightly against the side of the guide timbers in the mine shaft.

A further object of the invention is to provide a safety device of the character described in which the timber-engaging shoes, of whatever size are required to provide the desired deceleration of a cage with maximum load, are drawn positively into action by a primary operating winding mechanism.

A still further object of the invention is the provision of a mine cage safety device that even with frequent use occasions practically no wear or damage to the guide timbers in the shaft and furthermore wherein, after each use, each of the several sections of the brakes and brakes-operating mechanism automatically reset themselves and readily release the cage when tension is restored to the hoisting cable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 2 is a partial front elevation thereof with parts shown in section;

Figure 3 is a schematic and sectionalized side elevation of the wedge brake operating mechanism, projected therefrom.

2

Figure 1:
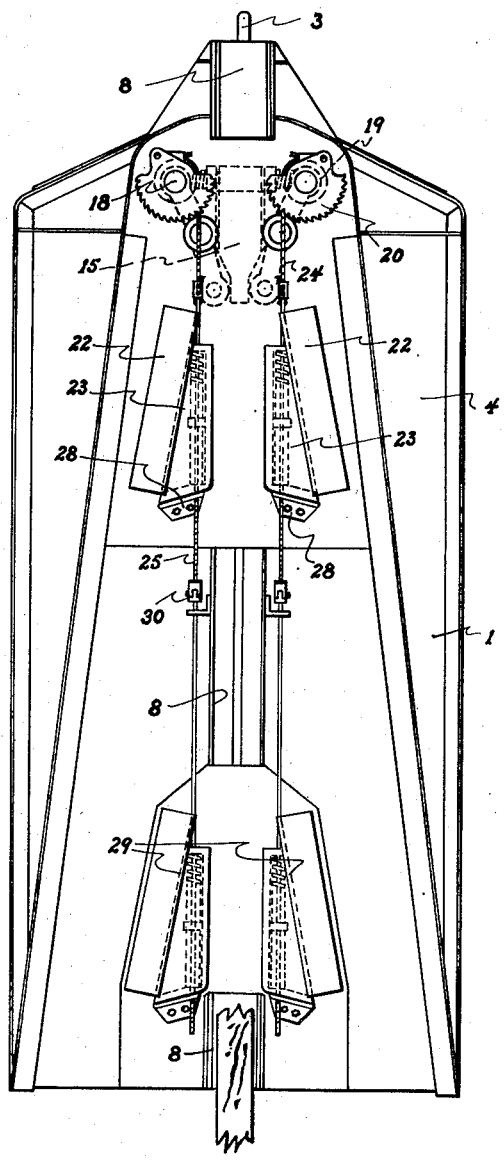
Figure 1 is a side elevation of a conventional man cage incorporating this improved automatic safety device.

The cage 1 is of conventional design with the usual main head beam 2, a draw bar 3 (for the hoisting cable, not shown) rising therefrom, wall plates 4 on one pair of opposite sides and rails 5 crossing the bottom, flush with the floor between the open sides of the cage that may or may not be equipped with safety doors. Though the cage 1 here shown is usual man cage type, it is intended that the term "cage" is to include any and all types of cages, skips, combinations or elevators hoisted in vertical or inclined shafts having guide rails, timbers or the like.

Sections of outwardly facing, vertically aligned, wear plate channels 8 are applied centrally to opposite side walls of the cage to receive and slide on the shaft guide timbers 49.

Below the head beam 2, a crossbar 9 is arranged and to it is bolted the lower end of the drawbar 3 that is freely slidable through a sleeve 10 in the head beam 2. This sleeve depends below the beam and serves as a "stop" to limit the upward movement of the crossbar 9 when the drawbar 3 is under tension of the hoisting cable. A pair of compression springs occur between and are nested in the beam and crossbar, one on either side of the sliding drawbar, with a spring adjusting screw 12 for each hanging downwards from the crossbar 9. If the hoisting cable slacks for any reason, these springs 11 (and gravity) depress the crossbar 9 for the distance of the length of the drawbar neck exposed above the head beam 2.

Transversely on opposite ends of the crossbar 9 are tapered spreader plates 15 with their narrow ends lowermost. On each side of each end spreader plate 15 is a grooved roller 16 rotatably mounted on the bottom of a teetering lever arm 17 pivoted to the inside of the cage wall with an axle shaft 18 extending from its upper end through a slot in the side wall and provided with a rotatable winding drum 19 on its outer end, exterior of the cage. The outer face of the drum is formed with a toothed or spur segment 20, here shown as of approximately 180° and a pair of such confronting toothed segments 20, normally spaced to clear the intermediate shaft guide timber, are held in extended or non-engaging position by horizontally disposed composed springs 21 interposed between the upper ends of the lever arms 17.

A pair of angularly positioned wedge frames 22 are arranged on each side wall of the cage, one on either side of the vertical median, converging toward the top—but even at their upper ends spaced a greater distance than the width of the timber channels 8 with which they are generally aligned. A wedge shaped brake shoe 23 is vertically slidable in each wedge frame 22, being connected with the winding drum 19 by a length of flexible cable 24 and a length of threaded rod 25. The latter passes through the wedge brake shoe 23 that has a laterally opening recess in which are accommodated an adjustable nut 26 and a pair of equalizer springs 27 on the rod 25, one above and the other below the said nut. Thus when the toothed segments 20 of the drums are caused to engage the shaft guide timbers, the downward movement of the cage relative thereto will rotate the winding drums 19 and the cables and rods 24 and 25 will draw up on the brake shoes 23 pressing the same by the co-action of the wedge shape of the shoes and the disposition of their frames against the guide timbers with great force. Angle rests 28 underlie the shoes and support them in nonoperative position.

In the Figures 1, 2 and 3, the wedgelike, brake shoes are shown in multiple, a second set 29 identical with those described are mounted lower down on the cage wall and connected in series to the former by an adjustable clevis 30, to equalize the tension on the springs in the lower shoes and permit of their easy removal for inspection.

Figure 4:
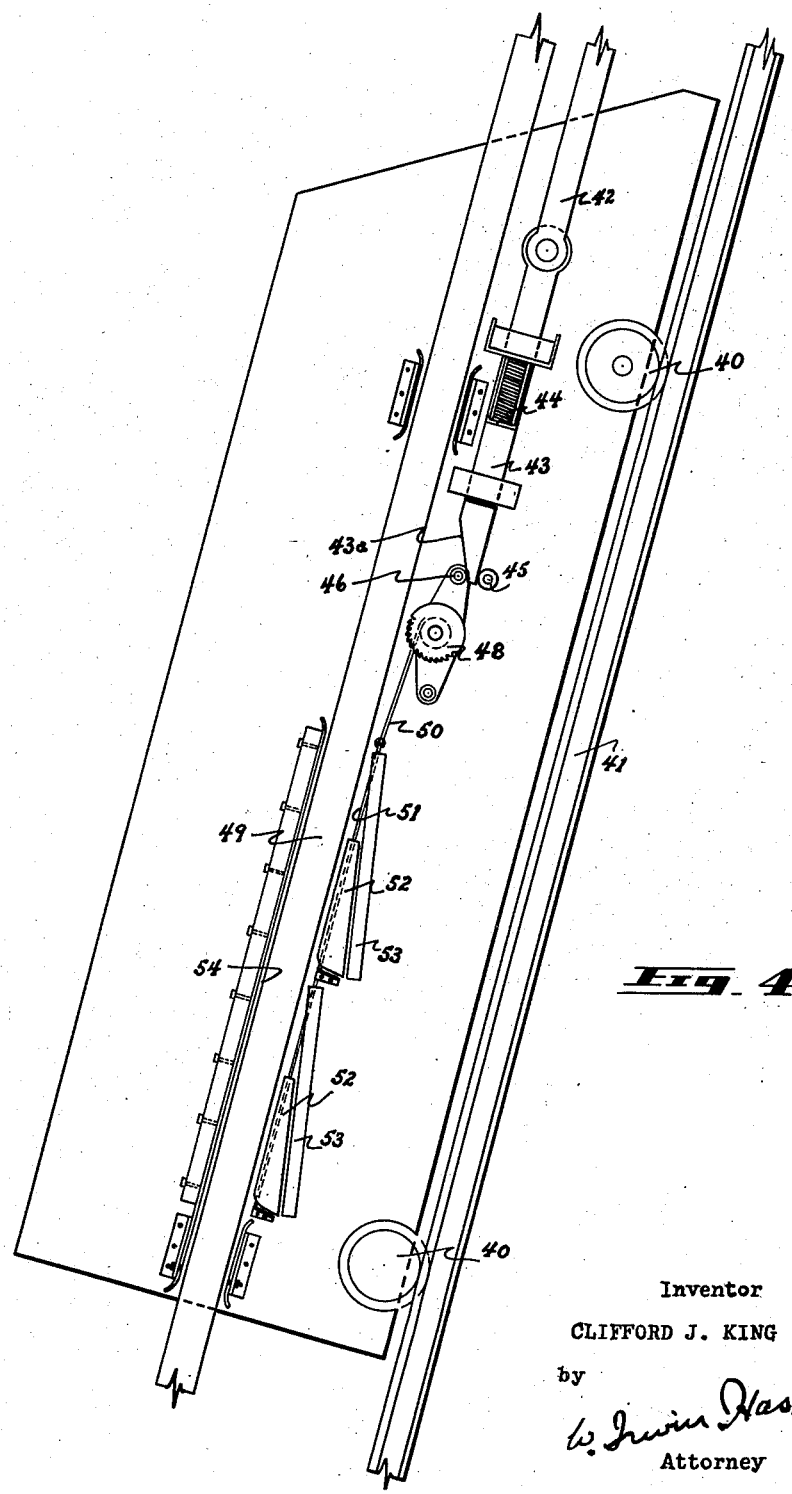
Figure 4 is an elevation of a cage for an inclined shaft with a modified form of my safety device applied thereto.

In Figure 4 is shown the adaptation of this same invention to a cage or skip for an inclined shaft. These shafts are usually at an angle of around 60° and the cage has wheels 40 to ride the shaft rails 41. The drawbar is in the form of a bail 42 that is pivotally connected to a slidable spreader bolt 43 that is normally retracted against a compressed coil spring 44 by the tension of the hoisting cable on the bail 42. This spreader bolt 43 supported on a roller 45 has an inclined face 43ª that engages a roller 46 mounted on the end of a rocker arm 47 fulcrumed at its opposite end to the cage and carries a toothed winding drum 48 midway of its length for engagement with the shaft guide timber 49. The winding drum operates a cable 50, rod 51 and wedge shaped brake shoes 52 in wedge frames 53 the same as in the previously described form. Brake shoes occur on the lower side only of the inclined guide timber 49, a runner shoe 54 to care for wheel wear being positioned on the opposite side of the timber.

It will be noted in both forms of the invention the brake shoes are smooth on their timber-engaging faces and have their lower inner corners rounded and their bottoms sloping outwards. This serves to rest the shoes in disengagement with the guide timbers, to eliminate any sudden, sharp engagement with the guide timbers and enables the brakes to be applied surely and evenly, providing more rapid and dependable deceleration than timber engaging toothed dogs of limited operating surface, that bite deeply into the guides, quickly clogging the teeth, damaging the guide rails and sometimes bouncing into and out of engagement and failing to hold, the latter being most likely to occur if the cage be fully loaded, descending at the time of hoist mechanism failure, or if the guide timbers be too soft or too hard.

In operation, when the drawbar 1 is under tension as when the hoisting cable is suspending the cage, the spreader bar 9 is pulled up against the action of springs 11 abutting the lower end of sleeve 10. When thus retracted, the spreader plates 15 allow the springs 21 to hold the winding drum gear segments clear of the shaft guide timbers and the brake shoes rest on the angle supports 28 and free of engagement with the timber guide rails. Immediately the cable breaks or the hoist fails for any reason, the spreader frame is shot downwards, the tapered end plates teeter the levers swinging the toothed segments of the winding drums inwards to bite into the guide timber and if the cage is falling, these drums are rotated and reel up the brakes' cables smoothly and surely drawing the brake shoes into wedging engagement with the intermediate timber, the force of which compression on the guide timber is increased by the relative movement of the cage. When the hoist is repaired, the tensioning of the cable just raises the spreader bar and releases the teeter levers so that the drum segments are pushed back from the guide timber. Then as the cage is raised, the shoes are freed from their vice-like grip on the timbers and drop by friction and gravity to their normal resting place, unwinding and resetting the toothed drums by the equalizer springs acting on the rods and cables. Thus restored, the drums by their pendulum design rest in "stand-by" position until again needed.

Inspection of the device is simple and the frequent testing that is desirable can be made without damage to either the brakes or shaft guide timbers.

From the foregoing description taken in connection with the accompanying drawings, it will be manifest that an automatic safety device for a mine cage is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. A mine cage safety device for use in a mine shaft having the usual guide timbers, comprising in combination with a cage and a hoisting cable therefor, a pair of vertically slidable, tapered brake shoes on the side of said cage engageable laterally with the shaft guide timber, a second similar pair of shoes further down on the same side of the cage, pairs of spaced angularly disposed brake shoe frames converging toward the guide timber at their upper ends, a normally inoperative brake-applying device connected with said pairs of shoes in tandem engageable with and rotatable by the usual guide timber and cable-tension retracted means contactable with said brake-applying device.

2. A mine cage safety device for use in a mine shaft having the usual guide timbers, comprising in combination with a cage and a hoisting cable therefor, a vertically movable brake shoe, with the bottom sloping outwards, engageable laterally with the shaft guide timber, an angularly disposed brake shoe frame converging toward the guide timber at its upper end, an inclined rest underlying said shoe sloping outwards co-operating with the sloping bottom of the shoe to automatically reseat and rest the shoe in disengagement with the shaft guide timbers, a normally inoperative brake-applying device engageable with and rotatable by the usual guide timber, a resilient and adjustable connection between said device and said shoe, and cable-tension retracted means contactable with said brake-applying device.

3. A mine cage safety device for use in a mine shaft having the usual guide timbers, comprising in combination with a cage and a hoisting cable therefor, a vertical movable brake shoe engageable laterally with the shaft guide timber, an angularly disposed brake shoe frame converging toward the guide timber at its upper end, an inclined rest underlying said shoe and sloping outwards throughout their shoe-supporting length, said shoe being smooth on its inner working face, rounded at its lower inner corner and declining toward its outer edge along its entire bottom parallel with said inclined supporting rest, whereby said shoe is supported by said rest in self-seating relationship, a normally inoperative brake-applying device connected with said shoe engageable with and rotatable by the guide timber and cable-tension retracted means contactable with said brake-applying device.

4. A mine cage safety device for use in a mine shaft having the usual guide timbers, comprising in combination with a cage and a hoisting cable therefor, a vertically slidable, wedge shaped brake shoe engageable laterally with the shaft guide timber, an angularly disposed brake shoe frame converging toward the guide timber at its upper end, a self resetting normally inoperative brake-applying device comprising a winding drum with concentric teeth engageable with and rotatable by biting into the usual guide timber, means connecting said device and said shoe, motivating means separate from but contactable against said brake-applying device connected to the hoist cable and springs operating on said motivating means against the tension of said cable.

5. A mine cage safety device for use in a mine shaft having the usual guide timbers and comprising, in combination with a cage and a hoisting cable therefor, a vertically movable brake shoe, a rest underlying the same, an angularly positioned wedge frame for said shoe converging at its upper end toward said guide timber, a brake operating mechanism responsive to the slackening of the tension on said hoisting cable and an adjustable connection between said mechanism and said shoe with two-way resilient means interposed between it and said shoe.

6. The combination with the structure set forth in claim 5 wherein the connection between said mechanism and shoe includes a flexible part and a threaded rod, the latter reaching to and slidable through the shoe and encircled by oppositely pressing coil springs engaging said shoe.

7. The combination with the structure set forth in claim 5 wherein the shoe has a laterally opening spring recess and the connection includes a length of threaded rod passing through the recess in said shoe and a pair of coil springs and an intermediate nut on said rod accommodated in the recess in said shoe.

8. A mine cage safety device for use in a mine shaft having the usual guide timbers and comprising, in combination with a cage and a hoisting cable therefor, a vertical movable brake shoe, a rest underlying the same, an angularly positioned wedge frame for said shoe converging at its upper end toward said guide timber, a brake operating mechanism responsive to the slackening of the tension on said hoisting cable and a retractable connection including a flexible portion windable by said mechanism and a rod portion reaching to and slidable through said shoe with a two-way acting resilient means interposed therein and housed within said shoe and means for adjusting said two-way acting resilient means.

9. In a mine cage safety device, the combination with a cage, a hoisting cable therefor and an accommodating shaft with the usual vertical guide timbers of a brake shoe engageable with one of the shaft guide timbers and brake-applying mechanism responsive to the slackening of the tension on said hoisting cable including a reeling device engageable with and operable by the shaft guide timber, a centrally pivoted lever on one end of which said reeling device is mounted and means engaging its opposite end for teetering said lever.

10. In a mine cage safety device, the combination with a cage, a hoisting cable therefor and an accommodating shaft with the usual vertical guide timbers of a brake shoe engageable with one of the shaft guide timbers and brake-applying mechanism responsive to the slackening of the tension on said hoisting cable including a teetering lever, a spring urged member operable against one end of said lever and normally held retracted by the tension of the same end of said hoisting cable, a winding reel on said lever engageable with the shaft guide timber and means connecting said reel and said shoe.

11. A safety device for a mine cage comprising in combination with a cage, a hoisting cable and a mine shaft having guide timbers, a drawbar to which the hoisting cable is attached, a vertically movable crossbar on the lower end thereof, cage mounted springs acting against said crossbar and normally compressed by the tension of the hoisting cable, transversely disposed, tapered plates on opposite ends of said crossbar, guide timber-engaging brakes on said cage, and cage mounted, brake-applying reels connected with said brakes and movable into contact with said guide timbers by said crossbar tapered plates.

12. A safety device for a mine cage comprising, in combination with a cage, a hoisting cable and a mine shaft having guide timbers, a drawbar to which the hoisting cable is attached, a vertically movable crossbar on the lower end thereof, cage mounted springs acting against said crossbar and normally compressed by the tension of the hoisting cable; transversely disposed, tapered plates on opposite ends of said crossbar, slidable guide timber-engaging brakes on the side of the cage, guide timber-operated winding reels connected with said brakes and cage-carried, pivoted lever arms on which said reels are mounted and against which said tapered plates engage.

13. A safety device for a mine cage comprising, in combination with a cage, a hoisting cable and a mine shaft having guide timbers, a drawbar to which the hoisting cable is attached, a vertically movable crossbar on the lower end thereof, cage mounted springs acting against said crossbar and normally compressed by the tension of the hoisting cable, transversely disposed, tapered plates on opposite ends of said crossbar, a centrally pivoted lever on said cage against one end of which one of said tapered plates operates, a winding reel engageable with a shaft guide timber rotatably mounted on the other end of said lever, vertically slidable guide timber-engaging brakes on the side wall of said cage, and flexible connections between said winding reel and said slidable brakes.

14. A safety device for a mine cage comprising, in combination with a cage, a hoisting cable and a mine shaft having guide timbers, a drawbar to which the hoisting cable is attached, a vertically movable crossbar on the lower end thereof, cage mounted springs acting against said crossbar and normally compressed by the tension of the hoisting cable, transversely disposed, tapered spreader plates on opposite ends of said crossbar, centrally pivoted levers carried by said cage, a guide timber-engageable winding reel on one end and a spreader plate-contacting roller on the other end of each of said levers, vertically slidable guide timber-engaging brakes on said cage, and flexible connections between said winding reels and said slidable brakes.

15. A safety device for a mine cage comprising, in combination with a cage, a hoisting cable and a mine shaft having guide timbers, a drawbar to which the hoisting cable is attached, a vertically movable crossbar on the lower end thereof, cage mounted springs acting against said crossbar and normally compressed by the tension of the hoisting cable, transversely disposed, tapered spreader plates on opposite ends of said crossbar, a pair of spaced substantially vertically disposed centrally pivoted cage-carried lever arms, one on either side of one of said spreader plates, a plate-engaging roller on the lower end of each lever arm, a compressed spring operating against the confronting sides of said arms near the top, brake applying mechanism on the upper ends of said arms and guide timber-engaging brakes on the side of said cage operatively connected to said mechanism.

16. The combination, with the structure set forth in claim 15, wherein the brake applying mechanism on the pivoted lever arm consists of a winding reel with a projecting, shaft guide timber-engaging toothed segment and a partly flexible connection to said brakes.

17. The combination with the structure set forth in claim 15, wherein the brake applying mechanism on the pivoted lever arms includes a shaft extending outwards through a slot in the side of the cage with a guide timber-engaging winding drum rotatably carried thereon exterior of the cage.

18. The combination, with the structure set forth in claim 9, of resetting means for said brake applying mechanism and said brake shoe respectively and operable in that order.

19. The combination, with the structure set forth in claim 15, wherein the brake applying mechanism on the pivoted lever arm consists of a winding reel with a projecting, shaft guide timber-engaging toothed segment, a length of flexible cable windable on said reel and a threaded rod continuing from the free end thereof carrying an adjustable nut and a pair of compression springs one on either side of said nut and said brakes consists of a shoe through which said rod is passed and that is laterally recessed to accommodate said nut and springs.

CLIFFORD JOHN KING.

REFERENCES CITED

The following references are of record in the file of this patent:

UNITED STATES PATENTS

| Number | Name | Date |
|---|---|---|
| 430,017 | Haudel | June 10, 1890 |
| 455,536 | Matthews | July 7, 1891 |
| 817,623 | Campbell | Apr. 10, 1906 |
| 1,303,271 | Durst | May 13, 1919 |
| 1,537,350 | Halbin | May 12, 1925 |

FOREIGN PATENTS

| Number | Country | Date |
|---|---|---|
| 2,724 of 1878 | Great Britain | July 8, 1878 |
| 7,692 | Norway | Nov. 6, 1899 |
| 200,080 | Germany | July 4, 1908 |
| 7,557 of 1927 | Australia | May 30, 1927 |